(12) United States Patent
Gray et al.

(10) Patent No.: US 10,451,513 B2
(45) Date of Patent: Oct. 22, 2019

(54) TORQUE CALIBRATING SYSTEM

(71) Applicant: National Oilwell Varco, L.P., Houston, TX (US)

(72) Inventors: Nathan D. Gray, Odessa, TX (US); Joe Yates, Odessa, TX (US)

(73) Assignee: National Oilwell Varco, L.P., Houston, TX (US)

( * ) Notice: Subject to any disclaimer, the term of this patent is extended or adjusted under 35 U.S.C. 154(b) by 292 days.

(21) Appl. No.: 15/637,158

(22) Filed: Jun. 29, 2017

(65) Prior Publication Data
US 2017/0299457 A1    Oct. 19, 2017

Related U.S. Application Data

(62) Division of application No. 14/459,045, filed on Aug. 13, 2014, now Pat. No. 9,726,567, which is a division of application No. 13/038,505, filed on Mar. 2, 2011, now Pat. No. 8,833,134.

(60) Provisional application No. 61/309,635, filed on Mar. 2, 2010.

(51) Int. Cl.
    *G01L 25/00*    (2006.01)
(52) U.S. Cl.
    CPC .................... *G01L 25/003* (2013.01)
(58) Field of Classification Search
    CPC .............................. G01L 25/003; G01L 25/00
    USPC ................ 73/1.09, 1.11, 1.12, 865.8, 865.9; 81/57.11, 57.15–57.21
    See application file for complete search history.

(56) References Cited

U.S. PATENT DOCUMENTS

| | | | |
|---|---|---|---|
| RE31,699 E * | 10/1984 | Eckel | E21B 19/164 73/862.25 |
| 4,938,109 A | 7/1990 | Torres et al. | |
| 7,359,801 B2 * | 4/2008 | Newman | E21B 19/166 702/182 |
| 8,280,639 B2 | 10/2012 | Conquergood et al. | |
| 2010/0138159 A1 | 6/2010 | Conquergood et al. | |

FOREIGN PATENT DOCUMENTS

WO    2007/033001 A2    3/2007

OTHER PUBLICATIONS

PCT Search Report and Written Opinion from PCT/US2011/026784 dated Jun. 28, 2011.
Canadian Office Action dated Jan. 9, 2017, for Canadian Patent Application No. 2,790,396 filed on Mar. 2, 2011 (PCT effective).

* cited by examiner

*Primary Examiner* — Robert R Raevis
(74) *Attorney, Agent, or Firm* — Amerson Law Firm, PLLC

(57) ABSTRACT

A torque calibrating system that includes a power tong, a load cell assembly, and a torque arm having first and second ends, wherein the first end is adapted to impose a load on the load cell assembly when the power tong is actuated to impose a torque on the second end. The system also includes a hydraulic system that is adapted to actuate the power tong, wherein the hydraulic system includes a pressure gage that is adapted to measure a hydraulic pressure in the hydraulic system when the power tong is actuated, the measured hydraulic pressure corresponding to the load imposed on the load cell assembly and to the torque imposed on the second end of the torque arm.

20 Claims, 8 Drawing Sheets

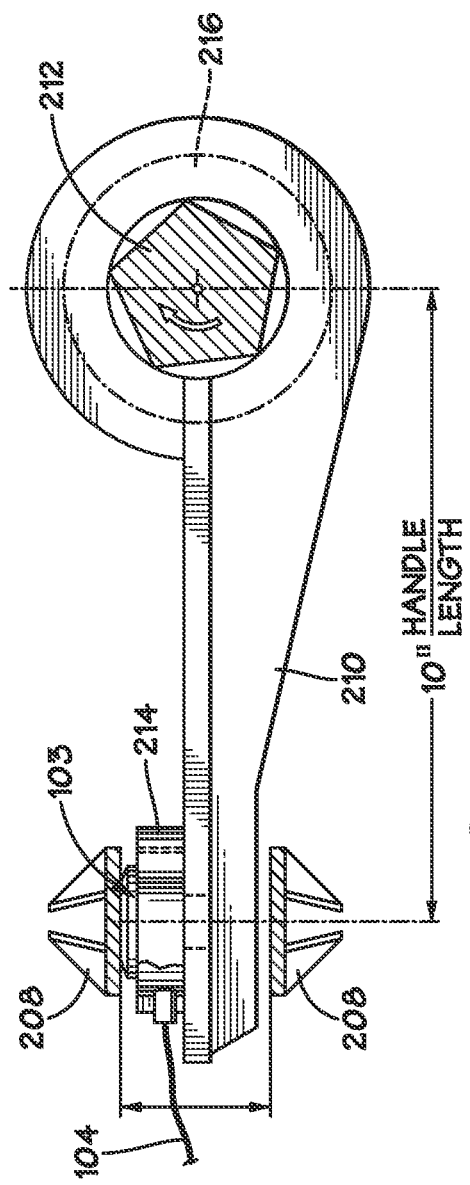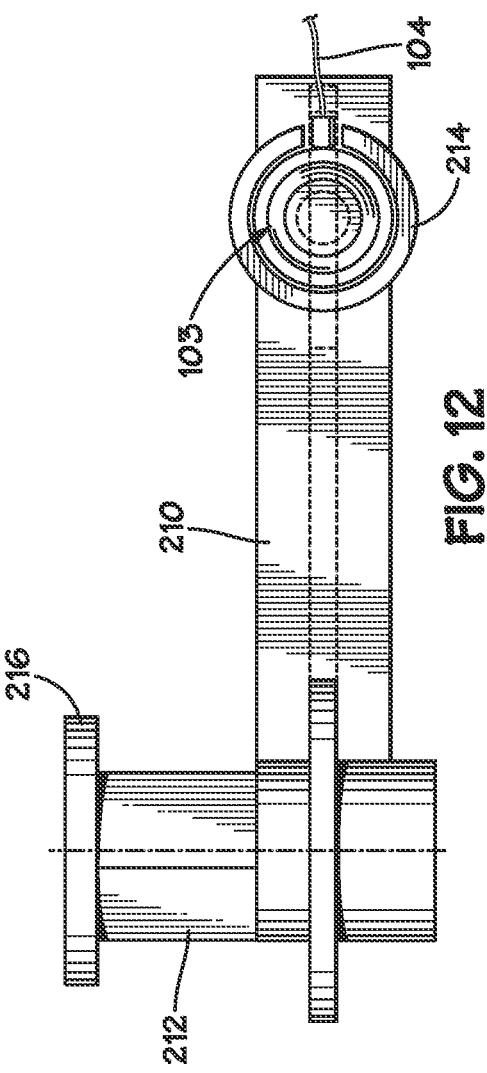

TORQUE CALIBRATING SYSTEM

CROSS-REFERENCE TO RELATED APPLICATIONS

This application is a divisional of U.S. patent application Ser. No. 14/459,045, filed Aug. 13, 2014, which was a divisional of U.S. patent application Ser. No. 13/038,505, filed Mar. 2, 2011, now U.S. Pat. No. 8,833,134, issued Sep. 16, 2014, which claimed priority from U.S. Provisional Patent application Ser. No. 61/309,635 filed on Mar. 2, 2010, and are hereby incorporated by reference for all they contain.

BACKGROUND

1. Field of the Disclosure

Generally, the present disclosure relates to power tongs for making up and breaking out threaded joints. More specifically, the present disclosure relates to methods, apparatuses, and systems for calibrating the torque that is applied by a power tong.

2. Description of the Related Art

Making up (tightening) and breaking out (loosening) threaded joints between tubular products (tubulars) are important operations in the various industrial applications involving the transfer of fluids. In oilfield applications, for example, it is quite common to make up (tighten) and/or break out (loosen) the threaded joints between various types of tubular products, such as tubing, casing, drill pipe, and the like. In some applications, threaded joints between tubulars may be made up to form lengths of tubular products (tubular strings) that are sufficient to perform operations such as the drilling of a borehole or the production of fluid from a borehole, and the like. In order to make up or break out a threaded joint between two tubulars, a "backup" tong engages a first of two tubulars, and a "power" tong engages a second of the two tubulars. The backup tong is adapted to hold the first tubular in relatively firm manner, while the power tong is adapted to apply torque to the second tubular so as to rotate it relative to the first tubular held by the backup tong. The direction of the torque applied to the second tubular by the power tong indicates whether a threaded joint is being made up (tightened) or broken out (loosened).

Power tongs used to apply torque to tubular products during make up and/or break out are typically classified as "open-head" or "closed-head." An "open-head" power tong has a central opening and a side opening providing a passage to the central opening. The side opening of an open-head power tong is sometimes referred to as the "throat." Both the central opening and the throat are large enough to receive a tubular, and the throat permits the open-head power tong to engage tubular by allowing the tubular to pass sideways through the throat and into or out of the central opening—i.e., horizontally. On the other hand, a "close-head" power tong only has a central opening, and does not have a throat to permit the sideways movement of the tubular into the central opening. Therefore, a closed-head power tong can only engage a tubular by allowing the tubular to pass into and out of the central opening through the top or the bottom of the closed-head power tong—i.e., vertically. Some aspects of various prior art power tongs are illustrated in FIGS. 1 and 2, which will now be discussed.

FIG. 1 shows an illustrative embodiment of a prior art open-head power tong from U.S. Pat. No. 4,170,907 (issued to Cathcart). It should be noted that the reference numbers used in Cathcart have not been preserved in FIG. 1, so as to avoid any duplication in numbering with the embodiments illustrated in the present disclosure. One embodiment of an open-head power tong 1 disclosed in Cathcart includes a bifurcated frame 2 defining a central opening 3 and a side opening 4. As shown in FIG. 1, jaws 5 are disposed within the central opening 3 for engaging a drill pipe, that is, when the drill pipe is positioned within the central opening 3. The jaws 5 are driven through a drive train (not shown) by a hydraulic motor 6, which receives fluid pressure from a hydraulic pump (not shown) through a hydraulic control valve 7. The hydraulic control valve 7 is movable between three spool positions: 1) a first position that drives the motor 6 in a clockwise direction; 2) a second position that drives the motor 6 in a counterclockwise direction; and 3) a third position that places the motor 6 in neutral. A door 8 is provided at the side opening 4 to control access to the central opening 3. Typically, the door 8 is closed while operating the power tong so as to protect the operator of the power tong from the moving jaws 5.

FIG. 2 shows an illustrative embodiment of a prior art open-head power tong from U.S. Pat. No. 4,445,403 (issued to Janzen et al.) As shown in FIG. 2, the power tong has a frame 10 defining a throat 20 for receiving a pipe (not shown). A circular opening 21 is provided in the center of the frame 10, and a pipe can pass through the throat 20 into the circular opening 21. A pair of arcuate bearing and guide segments 22, 24 is mounted on opposite sides of the throat 20 and a drive ring 38 is mounted for rotation relative to the frame 10. The drive ring 38 has an opening 40 that is of substantially the same size as the throat 20 and that is aligned with the throat 20. The drive ring 38 is guided along its outer periphery and retained within the frame by the bearing and guide segments 22, 24. Gear teeth (not shown) are secured to a projection that extends radially from the outer circumference of the drive ring 38. The gear teeth mesh with rotary idler gears 88 and 90 of a drive train 52 that is powered by a motor (not shown). Although not shown in FIG. 2, the power tong also includes a die carrier with means for gripping a pipe placed in the circular opening 21. When the drive ring 38 rotates, the die carrier also rotates, and cam action between the drive ring 38 and the die carrier rotates the means for gripping a pipe in contact with a pipe received in the circular opening 21.

In general, when making up a threaded joint, the torque applied to the tubular by the power tong should not be too high, as the threads may become overstressed and possibly even damaged. On the other hand, the applied torque should not be too low, as the threaded joint may leak and/or become loose during operation. Additionally, excessive torque that may be applied to tubular products, either when making up or breaking out threaded joints, may also damage the surfaces of the tubulars. Thus, monitoring or measuring the amount of torque applied by the power tong during a make-up or break-out operation may be an important component of operating the power tong. However, the equipment that is commonly available for measuring the make-up or break-out torque of a power tong can be expensive to buy, or to rent, and cumbersome to use. For example, in some prior art systems, a hydraulic load cell is positioned in a line extending from the power tong to a fixed point. As the tubular goods are being made up (or loosened), the hydraulic load cell measures the torque being applied on the tubular goods that are currently in the tong. The measurement of the torque is read from the hydraulic load cell, and it can be read either manually or automatically. This hydraulic load cell technique is typically applied when making or breaking every connection.

Consequently, in some operations, operators may choose to forego direct measurement of tong torque, and instead rely on secondary indications of applied torque, such the pressure reading of a pressure gage used to monitor hydraulic pressure in a hydraulic line connected to the tong. In other cases, operators may not even use secondary indications of torque, such monitoring hydraulic pressure, and may instead rely on experience alone to determine whether or not tong torque is within an appropriately safe range. The latter "experience-based" approach may often lead to many, if not most, of the threaded joints being over-torqued.

Accordingly, there is a need to provide a functional, accurate, and low cost torque-calibrating device for the type of power-tong operations often performed to make up or break out threaded joints between tubular products, so as address or reduce at least some of the problems outlined above.

SUMMARY OF THE DISCLOSURE

The following presents a simplified summary of the disclosure in order to provide a basic understanding of some aspects of the subject matter that is described in further detail below. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein relates to illustrative embodiments of a torque calibrating system. One illustrative embodiment of the present disclosure is a torque calibrating system that includes, among other things, a power tong, a load cell assembly, and a torque arm having first and second ends, wherein the first end is adapted to impose a load on the load cell assembly when the power tong is actuated to impose a torque on the second end. The disclosed torque calibrating system further includes a hydraulic system that is adapted to actuate the power tong, wherein the hydraulic system includes a pressure gage that is adapted to measure a hydraulic pressure in the hydraulic system when the power tong is actuated, and the measured hydraulic pressure corresponds to the load imposed on the load cell assembly and to the torque imposed on the second end of the torque arm.

In another exemplary embodiment, a torque calibrating system is disclosed that includes a closed-head power tong, a torque arm having a first end and a second end opposite of the first end, and a stem positioned proximate the first end of the torque arm. The stem is adapted to be removably inserted into a central opening of the closed-head power tong, and the closed-head power tong is adapted to impose a torque load on the stem when the stem is positioned in the central opening of the closed-head power tong. Furthermore, the torque calibrating system also includes a load cell assembly that is adapted to be positioned proximate the second end of the torque arm, wherein the load cell assembly is adapted to receive an external load from the second end of the torque arm when the closed-head power tong is driven to impose the torque load on the stem, and wherein the external load corresponds to the imposed torque load.

In yet a further illustrative embodiment of the present disclosure, a torque calibrating system includes, among other things, a power tong and a load cell assembly, wherein the load cell assembly includes a housing, a load cell disposed inside of the housing, and a load contact. The disclosed torque calibrating system further includes a torque arm having first and second ends, wherein the first end is adapted to impose a load on the load contact of the load cell assembly when the power tong is actuated to impose a torque on the second end, and wherein the load contact is adapted to transmit the imposed load to the load cell. Additionally, the torque calibrating system includes a hydraulic system that is adapted to actuate the torque calibrating system power tong, wherein the hydraulic system includes a pressure gage that is adapted to measure a hydraulic pressure in the hydraulic system when the power tong is actuated, and wherein the measured hydraulic pressure corresponds to the load imposed on the load cell assembly and to the torque imposed on the second end of the torque arm. Furthermore, the exemplary torque calibrating system includes a sensor indicator that is adapted to be operatively coupled to the load cell assembly, wherein the load cell assembly is adapted to sense the load imposed by the first end of the torque arm when the power tong is actuated and to transmit data corresponding to the sensed load to the sensor indicator.

BRIEF DESCRIPTION OF THE DRAWINGS

The disclosure may be understood by reference to the following description taken in conjunction with the accompanying drawings, in which like reference numerals identify like elements, and in which:

FIGS. 8-12 are various views of yet another closed-head power tong torque measuring system of the present disclosure.

Figure 1:
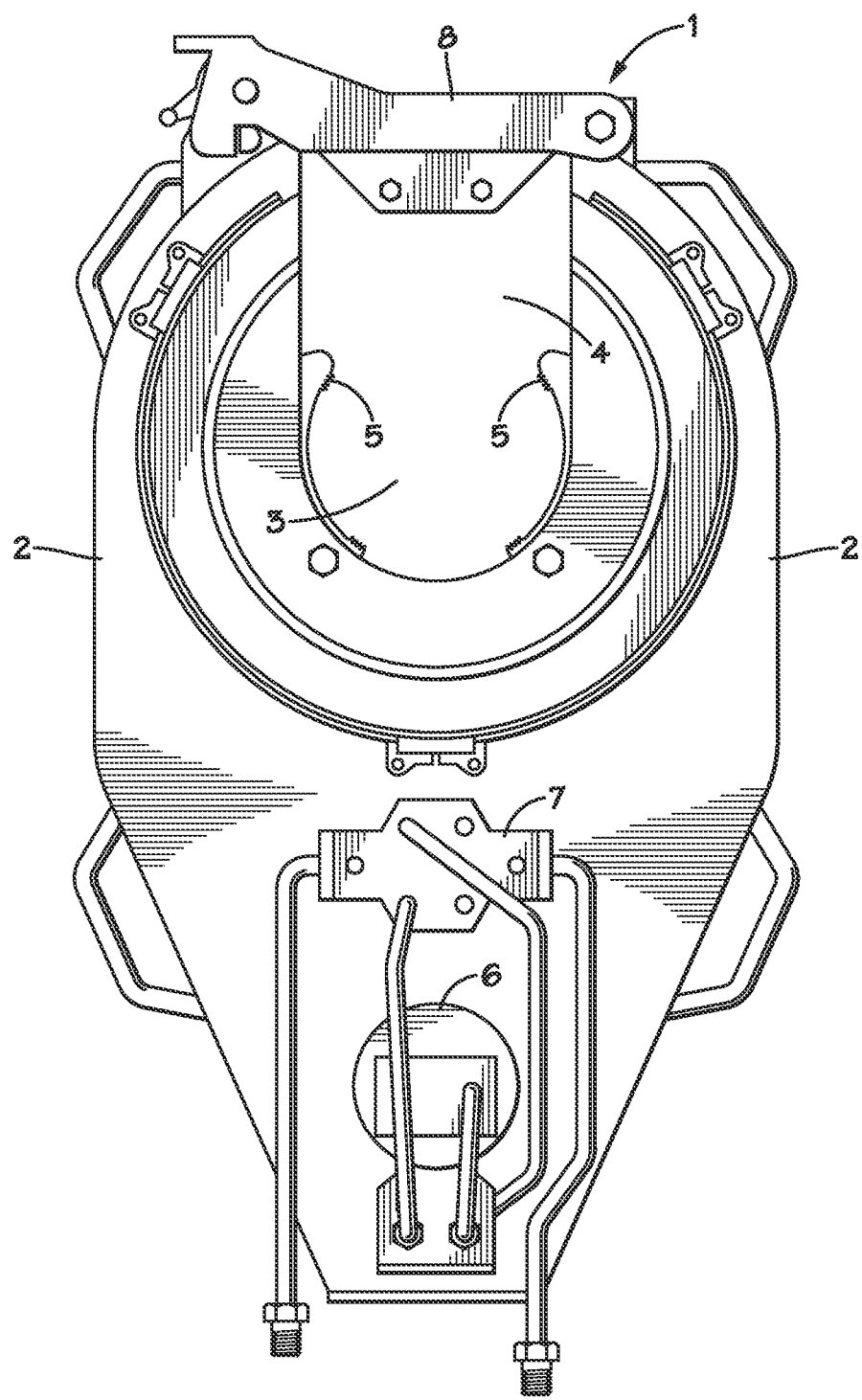
FIG. 1 is a plan view of an illustrative prior-art open-head power tong.
Figure 2:
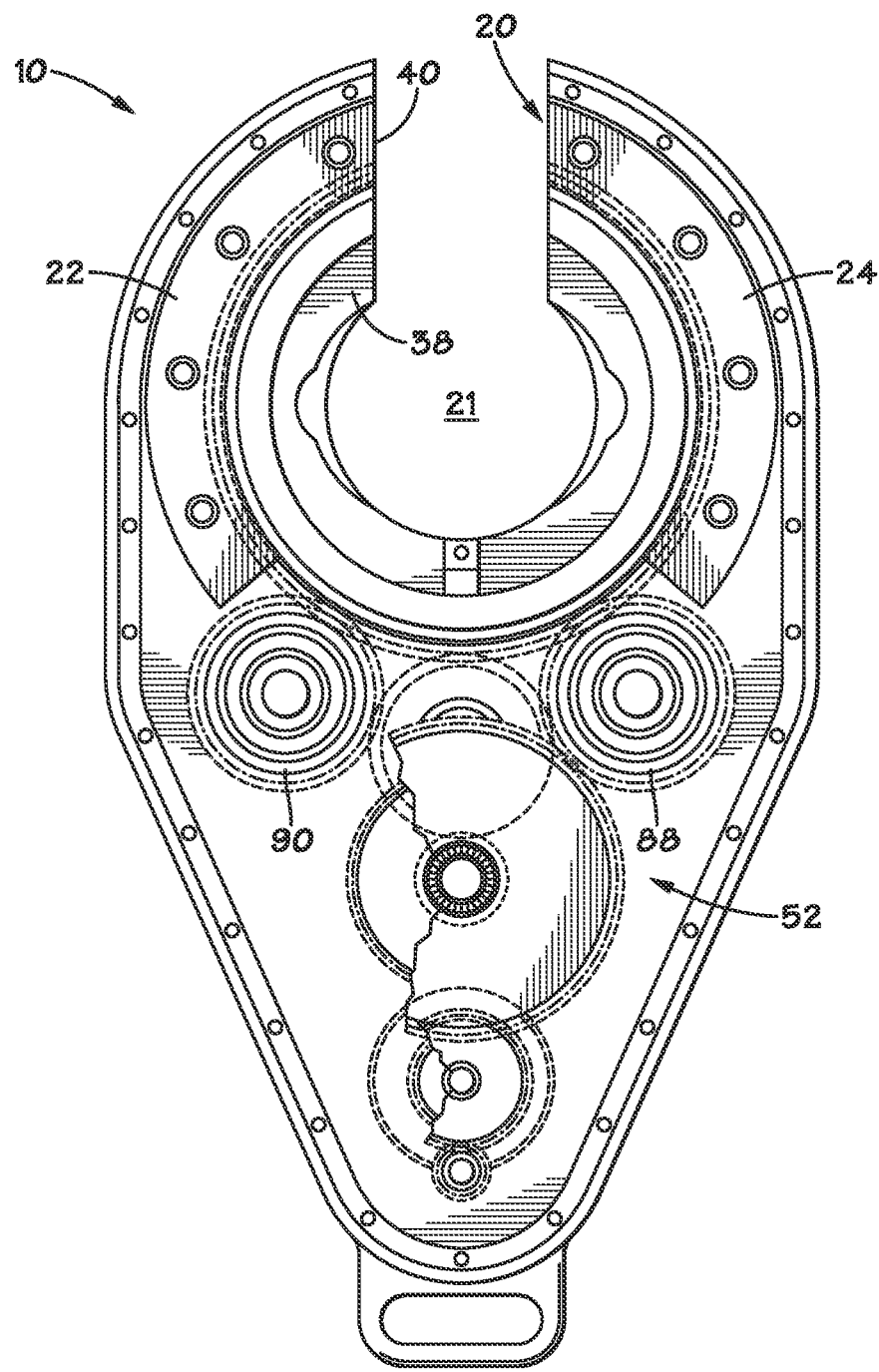
FIG. 2 is a plan view of another illustrative prior-art open-head power tong.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the subject matter defined by the appended claims to the particular forms disclosed, but on the contrary, the intention is to cover all modifications, equivalents, and alternatives falling within the spirit and scope of the claimed subject matter.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

It should be understood that, unless otherwise specifically indicated, any relative positional or directional terms that may be used in the descriptions below—such as "upper," "lower," "above," "below," "over," "under," "top," "bottom," "vertical," "horizontal," "toward," "away," and the like—are used for convenience, and should be construed in light of that term's normal and everyday meaning relative to the depiction of the components or elements in the referenced figures. Moreover, it should also be understood that in any actual application or installation, the illustrative valve assemblies disclosed herein may be positioned and/or rotated to any angle relative to the orientations depicted in the attached figures and described herein.

Figure 3:
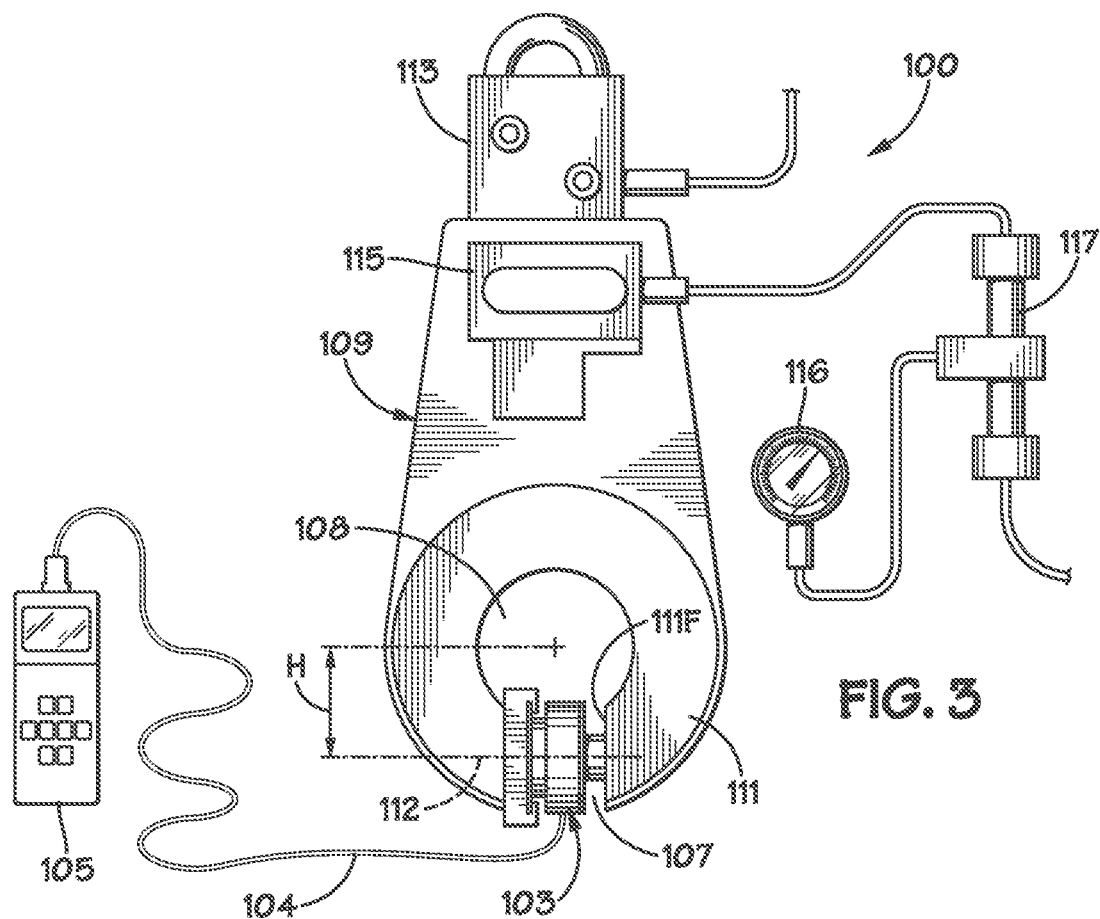
FIG. 3 is a schematic view of an illustrative open-head power tong torque measuring system of the present disclosure.
Figure 4:
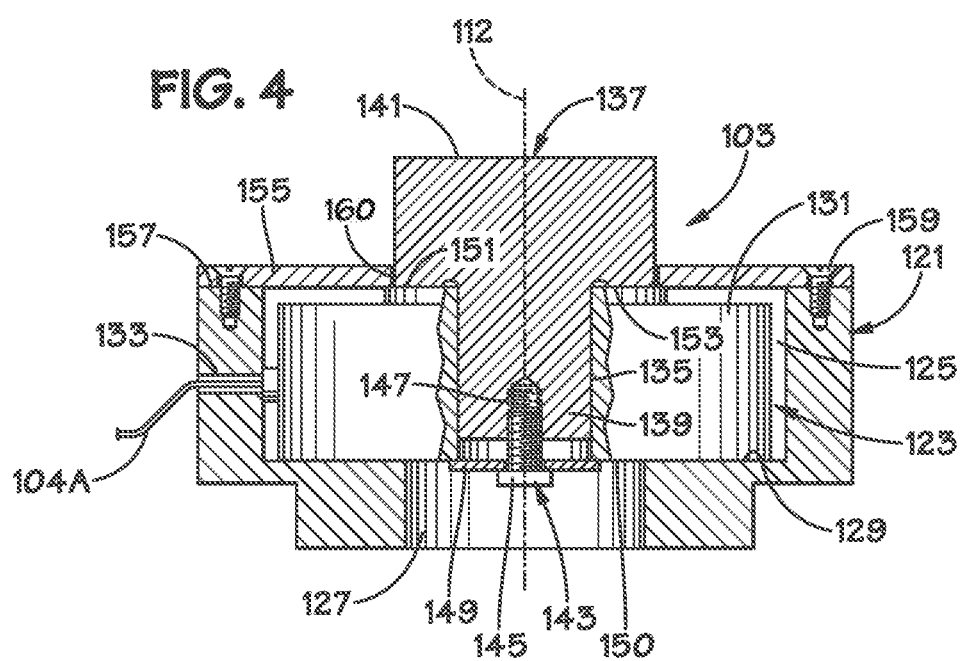
FIG. 4 is a cross-sectional view of an illustrative load cell assembly of the illustrative open-head power tong torque measuring system of FIG. 3.

FIG. 3 schematically depicts one illustrative embodiment of a torque calibrating system 100 for an illustrative open-head power tong 109 disclosed herein. As shown in FIG. 3, the torque calibrating system may comprise a load cell assembly 103 and a sensor indicator 105. In some embodiments, the sensor indicator 105 may communicate with a load cell within the load cell assembly 103 via a communication line 104, details of which are shown in FIG. 4 and discussed below. The sensor indicator 105 may be any one of several suitably designed sensor indicators capable of receiving and interpreting data from a load cell, as are well known in the art. For example, in one illustrative embodiment of the present disclosure, the sensor indicator 105 may be an SSI Smart Sensor Indicator Plug & Play, TEDS IEEE 1451.4, available from Transducer Techniques, Inc., of Temecula, Calif. For calibration purposes, in certain illustrative embodiments the load cell assembly 103 may be arranged in a throat (or side opening) 107 of an open-head power tong 109, which, in an open-head power tong configuration as described previously, may facilitate passage of a tubular product (not shown) to a circular center opening 108 of the open-head power tong 109.

In order to facilitate the measurement of the torque that may be applied by the power tong 109 to a tubular product during make up and/or break out, the load cell assembly 103 may, in some illustrative embodiments, be brought into contact with the drive ring 111 at the throat 107 of the power tong 109. In the illustrative embodiment depicted in FIG. 3, the axis 112 of the load cell assembly 103 may be aligned substantially perpendicular to the face 111f of the drive ring 111 at the throat 107. In some illustrative embodiments, the load cell assembly 103 may be positioned at the throat 107 such that the load cell within the load cell assembly 103 may be permitted to sense the load applied to the load cell assembly 103 by the drive ring 111 when the drive ring 111 is rotated during make up and/or break out operations, which may thereafter communicate the sensed data to the sensor indicator 105. In one illustrative embodiment, the drive ring 111 of the power tong 109 may be driven by a hydraulic motor 113 through a drive train (not shown), and in certain embodiments, the hydraulic motor 113 may be powered by fluid pressure from a hydraulic pump (not shown) through a hydraulic control valve 115.

In some illustrative embodiments, the sensor indicator 105 may process the load data obtained from the load cell and display the processed data to an operator. In one illustrative embodiment of the present disclosure, the processed data displayed to the operator may be in the form of, for example, a torque reading, which may be determined based on the specific load data obtained from the load cell, and the geometry of the power tong 109. In certain illustrative embodiments of the present disclosure, the torque calibrating system 100, including the load cell assembly 103 and sensor indicator 105, may be used to calibrate a power tong such as the illustrative open-head power tong 109 shown in FIG. 3, i.e., to establish a safe operating torque range for the power tong during make up and/or break out operations. After the power tong 109 is properly calibrated, the power tong 109 may be used in actual operation without the necessity of measuring the torque applied during every breaking or making of a tubular connection, as was common with some prior art techniques. By calibrating the power tong 109, the power tong 109 may be used in a more efficient and safer manner in that additional measuring tools and equipment need not be present every time the power tong 109 is actuated. One illustrative embodiment of a calibration method utilizing the torque measuring system 100 of the presently disclosed subject will be now described in detail below.

As shown in the illustrative embodiment of the torque measuring system 100 in FIG. 3, one illustrative method of calibrating the power tong 109, efforts may be undertaken to determine the minimum and maximum desired torque values that may be imparted by the power tong 109 to a threaded joint during a make-up and/or a break-out. The minimum and maximum torque values may, in some instances, depend on the tubular good to be handled by the power tong 109. The American Petroleum Institute (API) sets forth the minimum and maximum loading for various tubular goods. The API load ratings together with the handle length H of the power tong 109 can be used to determine the minimum and maximum torque values for the power tong 109. The handle length H of the tong 109 is measured from approximately the center of the contact between the load cell assembly 103 and the drive ring 111 to approximately the center of rotation of the drive ring 111 (which coincides with the center of the opening 108). Before or after the steps described above, a pressure gage 116 may be installed on a hydraulic line of the power tong 109. A hydraulic quick connect assembly 117, or other suitable device, may be used for connection of the pressure gage 116 to the hydraulic line. The hydraulic line is a conduit or network of conduits carrying the fluid necessary to power the hydraulic motor 113. The pressure gage 116 measures the hydraulic pressure on the hydraulic line.

An illustrative calibration method may include a step of arranging the load cell assembly 103 in the throat 107 of the power tong 109 as shown in FIG. 3. Before or after arranging the load cell assembly 103 in the throat of the power tong 109, and while in low gear, the power tong 109 is slowly closed against the load cell assembly 103. In addition, the hydraulic pressure is gradually increased with the engine (of the hydraulic motor) at full throttle. This action causes the drive ring 111 to apply a torque to the load cell assembly 103. The load cell within the load cell assembly 103 senses the applied torque and sends the sensed data to the sensor indicator 105. The sensor indicator 105 is monitored until a reading corresponding to the desired minimum torque value is shown. At this point, the position of the pressure gage 116 is recorded or noted, e.g., by noting down the position of the pressure gage 116, by physically marking the position on the pressure gage 116, etc. This recorded position corresponds to the desired minimum torque value. While still in low gear, the hydraulic pressure is gradually increased until the sensor indicator 105 displays a reading corresponding to the desired maximum torque value. At this point, the position of the pressure gage 116 is again recorded or noted. This second recorded position corresponds to the desired maximum torque value. The power tong 109 is now calibrated. The load cell assembly 103 can be removed from the power tong 109 and set aside to allow use of the tong for make-up or break-out operations. The operation of the power tong 109 will be guided by the noted or marked positions of the pressure gage 116.

FIG. 4 depicts one illustrative embodiment of the load cell assembly 103. As shown therein, the illustrative load cell assembly 103 includes a housing 121 having an internal chamber 123. The internal chamber 123 has a top chamber 125 and a bottom chamber 127. The housing 121 has an internal shoulder 129 between the top chamber 125 and the bottom chamber 127. In one illustrative embodiment, a load cell 131 is disposed within the top chamber 125 and arranged on the seat provided by the internal shoulder 129. A load cell is a device that converts force acting on it into an electrical signal. The load cell 131 includes a force transducer enclosed in a housing—the housing is what is visible in FIG. 4. The force transducer converts force acting on the load cell 131 into an electrical signal. Load cells suitable for use in the load cell assembly 103 are available on the market. The capacity of the load cell 131 will be dictated by the application. In some embodiments, a load cell having a capacity of at least 5,000 lbf may be used. In other embodiments, a load cell having a capacity of at least 20,000 lbf may be used. The load cell 131 may be any type of load cell capable of sensing torque or load, e.g., hydraulic load cell, electric load cell, and strain gage load cell. In one illustrative embodiment, the load cell 131 will be a strain-gage load cell. Suitable strain-gage load cells are available from, for example, Transducer Techniques, Inc., Temecula, Calif. A cable 104A extends out of the load cell 131 and passes through a port 133 in the housing 121 to the exterior of the housing 121. The cable 104A will be connected to the sensor indicator (105 in FIG. 3) for communication between the load cell 131 and the sensor indicator. It is also possible that such signals may be sent wirelessly.

In one embodiment, as illustrated in FIG. 4, the load cell 131 is an annular load cell with a central (through-hole) opening 135. A schematically depicted load contact 137 is partially arranged in the central opening 135. The load contact 137 has a stem 139 and a head 141. The stem 139 is received in the central opening 135. The diameter of the stem 139 is substantially the same as the diameter of the central opening 135. A lock 143 is inserted into the bottom of the stem 139 to lock the stem 139 in place within the central opening 135 and prevent the stem 139 from moving longitudinally relative to the central opening 135. In one example, the lock 143 includes a screw 145 received in a threaded opening 147 in the stem 139. A washer or retention plate 149 may be provided between the head of the screw 145 and the bottom face 150 of the load cell 131. The lock 143 is accessible through the bottom chamber 127. The head 141 of the load contact, which is attached to the stem 139 of the load contact, protrudes from the central opening 135 and the top face 151 of the load cell 131. The bottom face 153 of the head 141 makes contact with the top face 151 of the load cell 131, and the stem 139 extends from the bottom face 153 of the head 141 into the central opening 135. The load contact 137 receives an external force and transmits the external force (via contact with the load cell 131) to the load cell 131. The load contact 137 contacts the load cell 131 via the head 141 and the stem 139. In the example where the load cell assembly 103 is arranged at a throat of a power tong to measure torque, the head 141 of the load contact 137 would be the part of the load cell assembly 103 that makes contact with the drive ring 111 in order to receive a turning force or torque from the drive ring and transmit the force to the load cell 131. The load contact 137 may be made of a rigid material to enable it to transmit the force. Typically, the rigid material is a metal or alloy such as stainless steel, but other types of materials such as hard plastic may be also be used.

The load cell 131 may be retained within the top chamber 125 by a top plate 155 mounted on the top face 157 of the housing 121. The top plate 155 may be secured to the top face 157 of the housing 121 using any suitable means. For example, the top plate 157 may be secured to the top face 157 of the housing 121 using screws 159 inserted into aligned holes in the top plate 155 and top face 157. Other removable fasteners may be used in lieu of screws. The top plate 155 may also be permanently affixed to the top face 157 (such as by welding), but this would make it difficult to retrieve the load cell 131 from the top chamber 125 at a later time. The top plate 155 is provided with a central opening 160, which is coaxial with the internal chamber 123 of the housing 121. The central opening 160 in the top plate 155 is large enough to receive the head 141 of the load contact 137, but not large enough to receive the load cell 131 (thus, the load cell 131 cannot fall out of the top chamber 125 through this opening).

Figure 5:
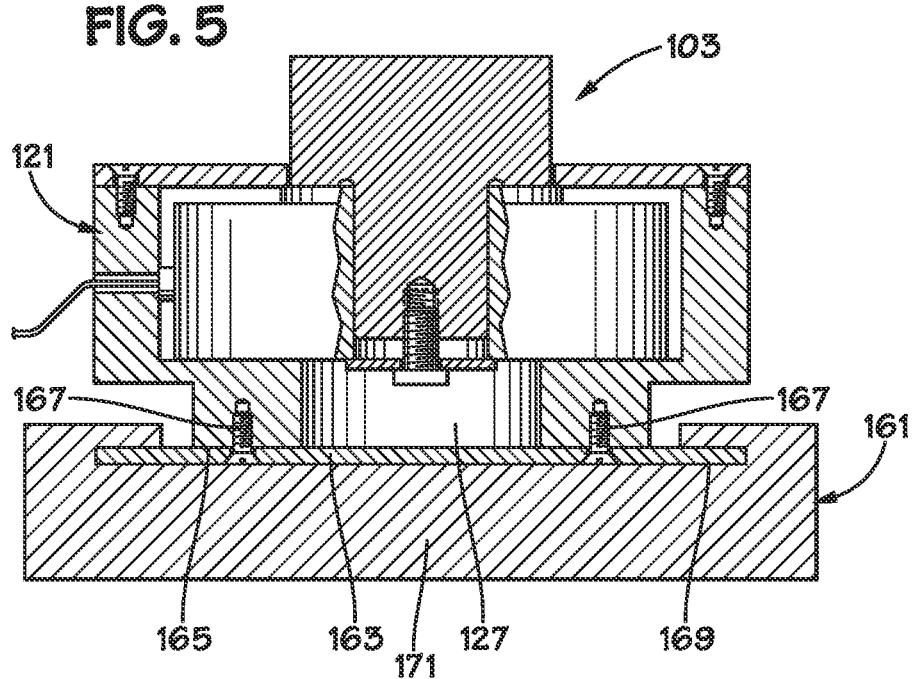
FIG. 5 is a cross-sectional view of an illustrative handling apparatus of the illustrative open-head power tong torque measuring system of FIG. 3.

In FIG. 5, an illustrative handling apparatus 161 is coupled to the load assembly 103. The handling apparatus 161 includes a bottom plate 163, which is attached to the bottom face 165 of the housing 121 using a suitable means. The suitable means could be, for example, screws 167 inserted into aligned holes in the bottom plate 163 and bottom face 165. Other removable fasteners may be used in lieu of screws. Alternately, the bottom plate 163 may be permanently affixed to the bottom face 165, but this would make it difficult to access the bottom chamber 127 of the housing 121. In one illustrative embodiment, the bottom plate 163 is inserted into a slot 169 formed in a bracket 171.

Figure 6:
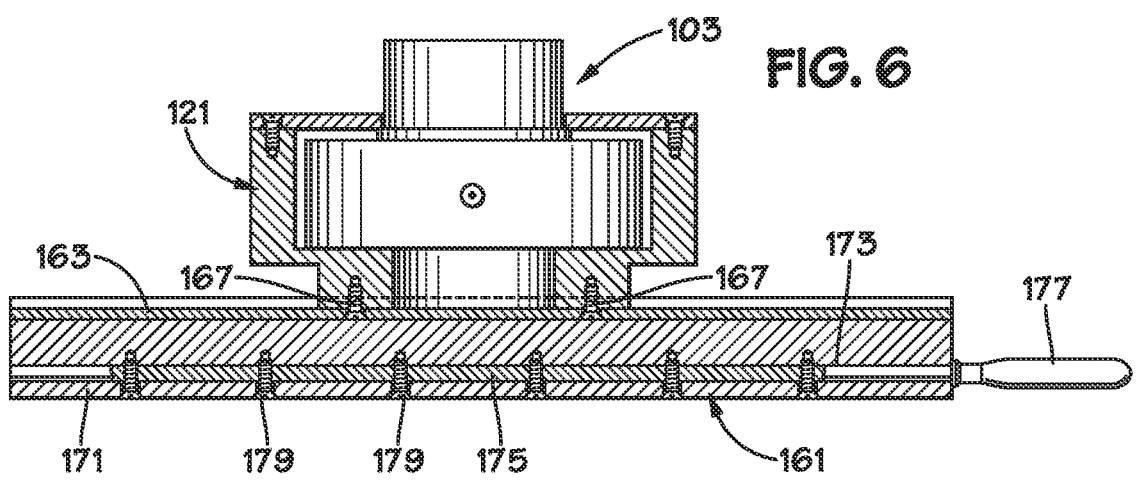
FIG. 6 is another cross-sectional view of the illustrative handling apparatus of FIG. 5.

As shown in FIG. 6, the bracket 171 has a longitudinal hole 173 inside of which is received a bar 175 with an attached handle 177. The handle 177 is located on the exterior of the bracket 171. The bar 175 is secured to the bracket 171 using suitable means. For example, screws 179 may be inserted in aligned holes in the bar 175 and bracket 171 to secure the bar 175 to the bracket 171. Other fasteners besides screws may also be used to secure the bar 175 to the bracket 171. The bar 175 may also be secured in the longitudinal hole 173 by an adhesive.

The load cell assembly 103 can be handled by means of the handling apparatus 161. The handling apparatus 161 may be useful when using the load cell assembly 103 to measure torque in an open-head power tong 109. Without any modifications to the throat 107 of the power tong 109, an operator or other device can position the load cell assembly 103 in the throat 107 of the power tong 109 and hold onto the handle 177 while measurements are being taken. The handle 177 can be shaped such that a human operator or a tool or robot can hold it.

Figure 7:
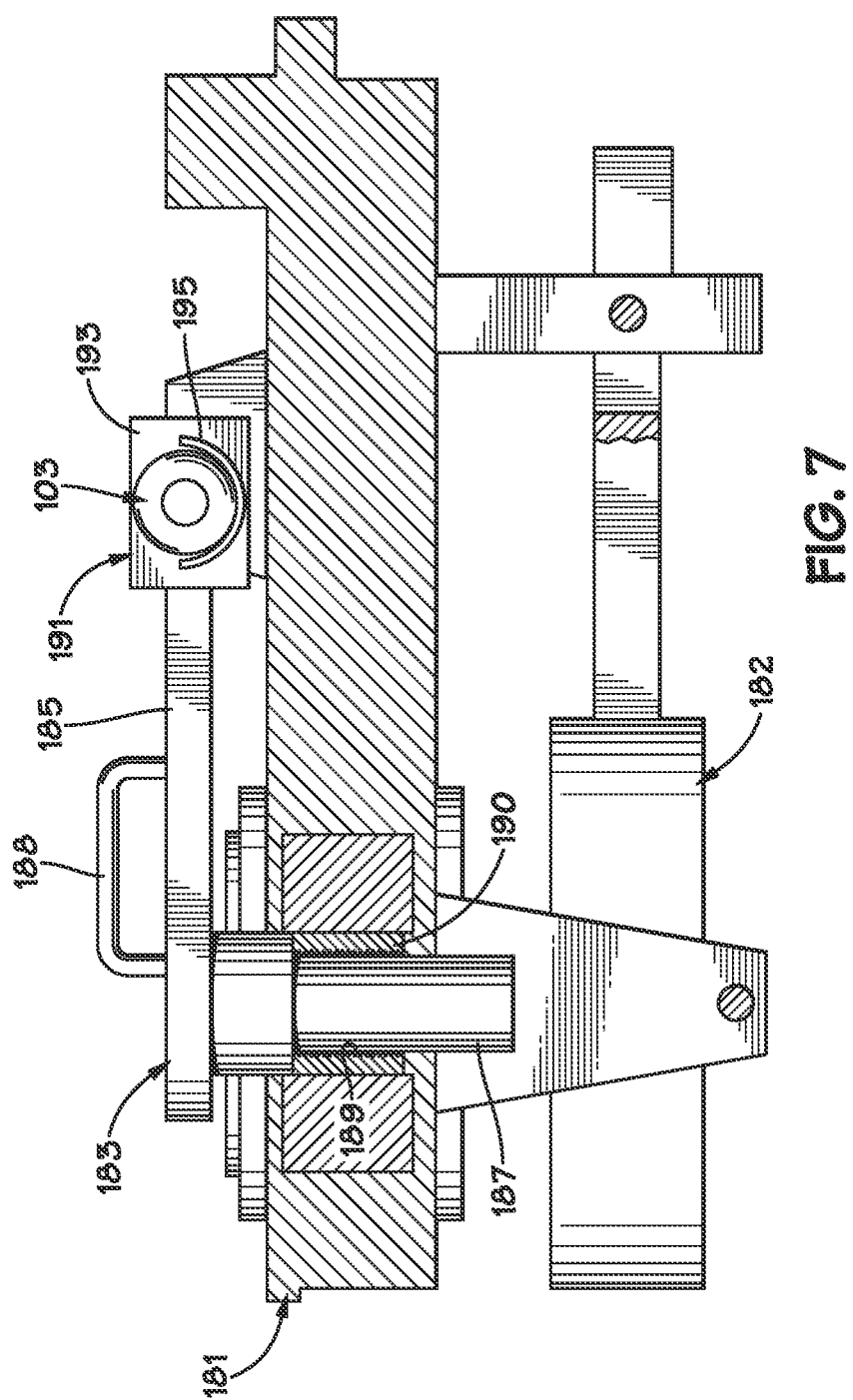
FIG. 7 is a schematic view of an illustrative closed-head power tong torque measuring system of the present disclosure.

The load cell assembly 103 may also be used for torque measurements in a closed-head power tong as well. FIG. 7 shows an embodiment where the load cell assembly 103 is used for torque calibration in an illustrative closed-head power tong 181. In FIG. 7, a backup tong 182 is coupled to the power tong 181, as is typical of Foster-style tongs. In the embodiment of FIG. 7, a torque arm 183 includes an elongated arm 185 and a head 187. In the illustrative embodiment depicted in FIG. 7, the torque arm 183 is adapted to be inserted from the top into the closed-head power tong 181. The head 187 is attached crosswise to one end of the arm 185 and is inserted into the central opening 189 of the closed-head tong 181 for making torque measurements for calibration purposes. The torque arm 183 is provided with a lifting handle 188, which facilitates insertion and removal of the head 187 from the central opening 189 of the closed-head tong 181. During torque measurements, a die carrier 190 with gripping means engages the head 187 and applies torque to the head 187. At the other end of the elongated arm 185 is a holder 191 for the load cell assembly 103. In one embodiment, the holder 191 includes a flat plate 193 attached to the elongated arm 185, for example, by welding. A semicircular wall 195 is attached to the flat plate 193, for example, by welding. The semicircular wall 195 forms a receptacle for holding or retaining the load cell assembly 103. In some embodiments, the load cell assembly 103 is removably positioned within the receptacle without being physically attached to the torque arm 183. Torque applied to the head 187 is transmitted to the load cell within the load cell assembly 103 through the elongated arm 185. As torque is applied to the load arm 183, the load cell assembly is urged against the tong hanger bracket plate (not shown in FIG. 7), and the torque reading is obtained via the sensor indicator 105, as previous described. The torque arm 183 is a rigid member capable of transmitting force. The torque arm 183 may be made of a metal or alloy such as stainless steel. Other types of rigid materials such as hard plastic may be also be used to make the torque arm 183.

Figure 8:
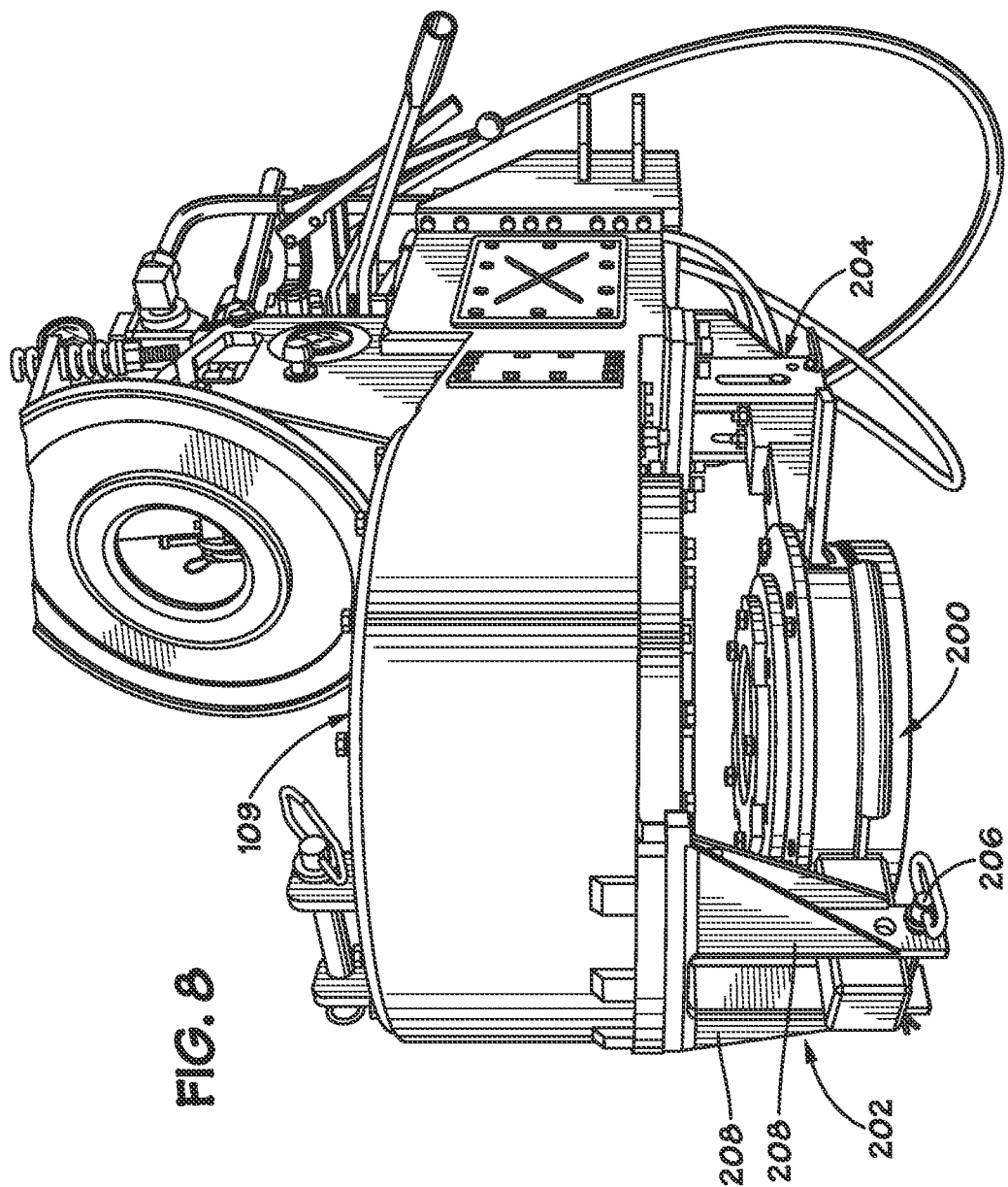
Figure 9:
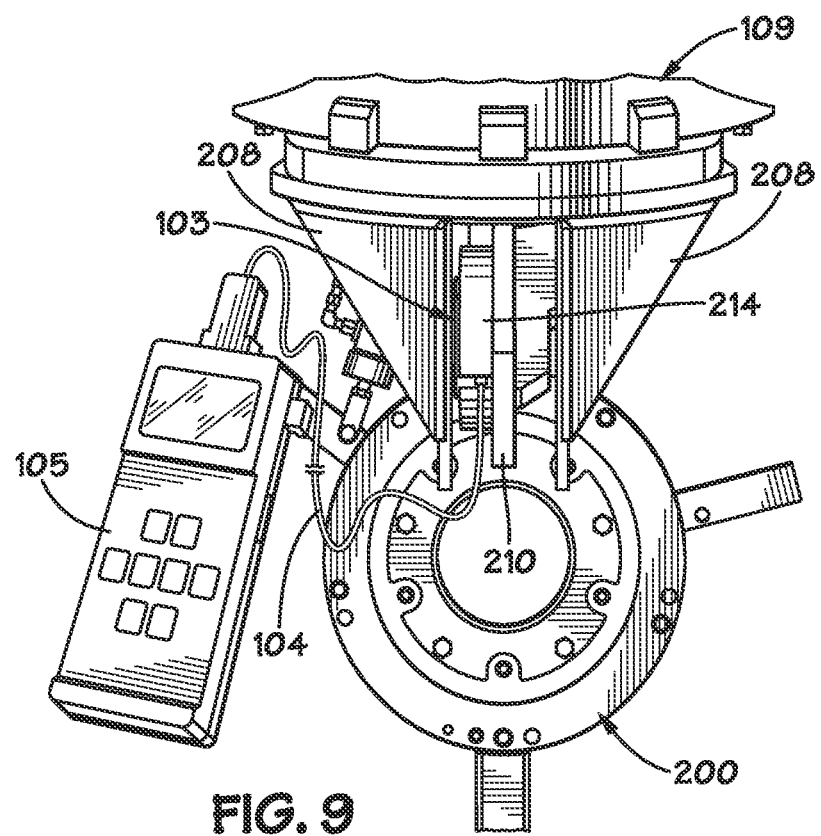

FIGS. 8-12 depict yet another illustrative embodiment of a closed-head power tong torque calibrating system. FIG. 8 depicts an illustrative closed-head power tong 109 that includes a backup tong 200. The backup tong 200 is coupled to the power tong 109 via a front support 202 and a rear support 204. The front of the backup tong 200 is releasably coupled to the power tong 109 by a removable support pin 206 that extends between two support brackets 208, as shown in FIG. 8. The rear support 204 permits the backup tong 200 to swing down and away from the position shown in FIG. 8 to the position shown in FIG. 9. In some illustrative embodiments, the rear support 204 may also permit the backup tong 200 to swivel about a vertical axis extending upward through the rear support 204. As will be described more fully below, FIG. 9 also depicts an illustrative embodiment of the load cell assembly 103 positioned between the support brackets 208.

Figure 10:
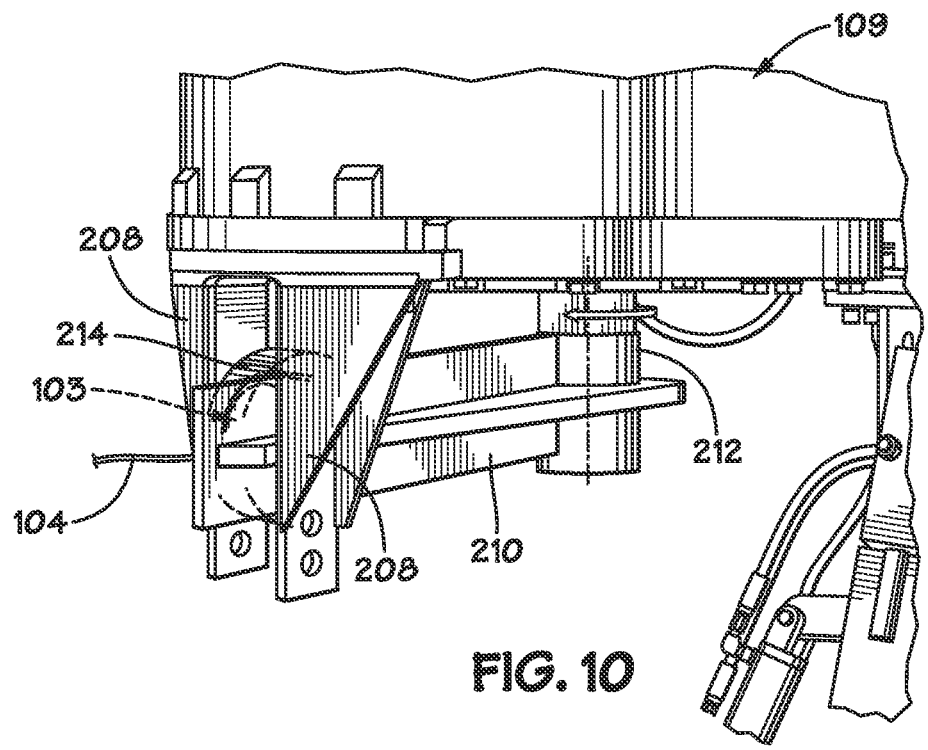

FIGS. 10-12 depict various illustrative views of a load cell assembly 103 and torque arm 210 that may be employed as described herein. In the illustrative embodiment depicted herein, the torque arm 210 is adapted to be inserted into the bottom of a closed-head power tong. In the depicted example, the illustrative torque arm 210 comprises a stem 212 on one end of the arm 210 and a load cell bracket 214 positioned on the opposite end of the torque arm 210. In one illustrative embodiment, the stem 212 has a five-sided configuration and it is adapted to be inserted into the central opening 108 of the power tong 109 to facilitate engagement with the dies within the power tong 109. The load cell assembly 103 may be positioned so as to freely float within the bracket 214 or is may be removably coupled or permanently affixed within the bracket 214.

One illustrative technique for calibrating the torque of the power tong 109 depicted in FIGS. 8-12 will now be described. Initially, the support pin 206 is removed, thereby permitting the backup tong 200 to be lowered out of the way, e.g., to the position shown in FIG. 9. As noted earlier, the rear support 204 may also be a double swivel type connection so as to permit the backup tong 200 to be rotated both horizontally and vertically. With the dies (not shown) of the power tong 109 in the open position, the stem 212 of the torque arm 210 is inserted from the bottom into the central opening 108 of the power tong 109 until the top flange 216 of the stem 212 comes to rest on top of the dies. At this point, the load cell assembly 103 is positioned in the support bracket 214 with the data cord 104 passing between the two. At this point, the hydraulic pressure is slowly increased so as to slowly rotate the power tong 109. The dies are then gently closed on the stem 212. With the torque arm 210 and load cell assembly 103 so positioned, the desired minimum and desired maximum torque values can be determined and, if desired, marked on the pressure gage 116 as described earlier with respect to other illustrative embodiments of the present invention.

As noted earlier, calibration of power tongs using the devices and techniques disclosed herein enables cost-effective, efficient and safe use of power tongs as compared to prior art techniques that monitored or measured the applied torque to tubular goods every time a connection was made or broken. By calibrating power tongs as described herein, in one illustrative embodiment, operators may readily make reference to calibrated hydraulic fluid pressure to control the desired minimum and/or maximum torque to be applied to the tubular goods without having to use cumbersome measurement devices every time a connection is made or broken.

The particular embodiments disclosed above are illustrative only, as the subject matter defined by the appended claims may be modified and practiced in different but equivalent manners apparent to those skilled in the art having the benefit of the teachings herein. For example, some or all of the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A torque calibrating system, comprising
   a power tong;
   a load cell assembly;
   a torque arm having first and second ends, said first end being adapted to impose a load on said load cell assembly when said power tong is actuated to impose a torque on said second end;
   a hydraulic system adapted to actuate said power tong, said hydraulic system comprising a pressure gage that is adapted to measure a hydraulic pressure in said hydraulic system when said power tong is actuated, said measured hydraulic pressure corresponding to said load imposed on said load cell assembly and to said torque imposed on said second end of said torque arm.

2. The system of claim 1, wherein said power tong is a closed-head power tong.

3. The system of claim 1, wherein said load cell assembly comprises:
   a housing;
   an annular load cell disposed inside of said housing, said annular load cell having a central opening; and
   a load contact comprising a contact head and a center stem extending from said contact head, wherein said center stem is positioned in said central opening of said annular load cell and said contact head is adapted to contact said annular load cell when said first end of said torque arm imposes said load on said load cell assembly.

4. The system of claim 3, wherein said load cell assembly further comprises a lock coupled to said center stem, said lock being adapted to prevent movement of said load contact relative to said load cell.

5. The system of claim 1, wherein said load cell assembly comprises:
   a housing;
   a load cell disposed inside of said housing; and
   a load contact comprising a head that is adapted to transmit said imposed load to said load cell when said first end of said torque arm imposes said load on said load cell assembly.

6. The system of claim 1, further comprising a stem coupled to said second end of said torque arm.

7. The system of claim 6, wherein said stem is adapted to be positioned in a center opening of said power tong.

8. The system of claim 1, further comprising a sensor indicator that is adapted to be operatively coupled to said load cell assembly, wherein said load cell assembly is adapted to sense said load imposed by said first end of said torque arm when said power tong is actuated and to transmit data corresponding to said sensed load to said sensor indicator.

9. The system of claim 1, wherein said torque calibrating system is adapted to be operated so as to calibrate an operating torque range for said power tong.

10. A torque calibrating system, comprising:
    a closed-head power tong;
    a torque arm having a first end and a second end opposite of said first end;
    a stem positioned proximate said first end of said torque arm, wherein said stem is adapted to be removably inserted into a central opening of said closed-head power tong and wherein said closed-head power tong is adapted to impose a torque load on said stem when said stem is positioned in said central opening of said closed-head power tong; and
    a load cell assembly that is adapted to be positioned proximate said second end of said torque arm, wherein said load cell assembly is adapted to receive an external load from said second end of said torque arm when said closed-head power tong is driven to impose said torque load on said stem, said external load corresponding to said imposed torque load.

11. The system of claim 10, wherein said stem has a five-sided cross-sectional configuration.

12. The system of claim 10, wherein said load cell assembly is adapted to be removably positioned in a load cell assembly holder that is positioned proximate said second end of said torque arm.

13. The system of claim 10, wherein said stem is adapted to engage a plurality of dies comprising said closed-head power tong when said closed-head power tong is actuated to impose said torque load on said stem.

14. The system of claim 10, further comprising a data unit that is adapted to receive data from said load cell assembly.

15. The system of claim 10, wherein said load cell assembly is adapted to be positioned between two support structures that are adapted to support a backup tong.

16. The system of claim 10, wherein said load cell assembly is adapted to be urged against a fixed structure when said closed-head power tong is actuated.

17. The system of claim 10, wherein said load cell assembly comprises:
    a housing;
    a load cell disposed inside of said housing; and
    a load contact comprising a head that is adapted to contact said load cell when said external load is imposed on said load cell assembly by said second end of said torque arm.

18. The system of claim 17, wherein said load cell is an annular load cell having a central opening, said load contact further comprising a center stem extending from said head, wherein said center stem is adapted to be positioned in said central opening of said annular load cell.

19. The system of claim 10, further comprising a hydraulic system that is adapted to be operatively coupled to said closed-head power tong, said hydraulic system comprising:
    a hydraulic motor that is adapted to drive said closed-head power tong; and
    a pressure gage that is adapted to measure a hydraulic pressure in said hydraulic system when said closed-head power tong is actuated to impose said torque load on said stem, said measured hydraulic pressure corresponding to said imposed torque load.

20. A torque calibrating system, comprising
    a power tong;
    a load cell assembly, comprising:
      a housing;
      a load cell disposed inside of said housing; and
      a load contact;
    a torque arm having first and second ends, said first end being adapted to impose a load on said load contact of said load cell assembly when said power tong is actuated to impose a torque on said second end, wherein said load contact is adapted to transmit said imposed load to said load cell;

a hydraulic system adapted to actuate said power tong, said hydraulic system comprising a pressure gage that is adapted to measure a hydraulic pressure in said hydraulic system when said power tong is actuated, said measured hydraulic pressure corresponding to said load imposed on said load cell assembly and to said torque imposed on said second end of said torque arm; and a sensor indicator that is adapted to be operatively coupled to said load cell assembly, wherein said load cell assembly is adapted to sense said load imposed by said first end of said torque arm when said power tong is actuated and to transmit data corresponding to said sensed load to said sensor indicator.

\* \* \* \* \*